US006999736B2

(12) United States Patent
Nitta

(10) Patent No.: US 6,999,736 B2
(45) Date of Patent: Feb. 14, 2006

(54) TRANSMITTING APPARATUS

(75) Inventor: Hitoshi Nitta, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 534 days.

(21) Appl. No.: 10/038,683

(22) Filed: Jan. 8, 2002

(65) Prior Publication Data

US 2002/0142740 A1    Oct. 3, 2002

(30) Foreign Application Priority Data

Mar. 27, 2001 (JP) ............................. 2001-08977

(51) Int. Cl.
  *H04B 1/04*   (2006.01)
  *H04B 1/38*   (2006.01)
  *G05F 5/00*   (2006.01)

(52) U.S. Cl. ............. 455/117; 455/127.1; 455/127.5; 455/572; 455/343.1; 455/127.7; 323/299

(58) Field of Classification Search ........... 455/127.1, 455/127.5, 127.6, 127.7, 571, 572, 574, 115.1, 455/67.11, 423, 343.1, 343.5, 117; 327/50, 327/56, 77; 323/299, 301, 282, 284, 234
See application file for complete search history.

(56) References Cited

U.S. PATENT DOCUMENTS

| | | | | |
|---|---|---|---|---|
| 4,761,824 A | * | 8/1988 | Saito | 455/127.1 |
| 4,912,774 A | * | 3/1990 | Saito | 455/117 |
| 5,287,014 A | * | 2/1994 | Kinoshita | 327/74 |
| 5,729,572 A | * | 3/1998 | Oh | 375/219 |
| 6,137,696 A | * | 10/2000 | Hall et al. | 363/21.05 |
| 6,215,286 B1 | * | 4/2001 | Scoones et al. | 323/222 |
| 6,256,520 B1 | * | 7/2001 | Suzuki | 455/572 |
| 6,643,527 B1 | * | 11/2003 | Satoh et al. | 455/574 |

FOREIGN PATENT DOCUMENTS

| | | |
|---|---|---|
| JP | 10-326116 | 12/1998 |
| JP | 11-346182 | 12/1999 |
| JP | 2000-209848 | 7/2000 |

* cited by examiner

*Primary Examiner*—Duc M. Nguyen
(74) *Attorney, Agent, or Firm*—Nixon & Vanderhye P.C.

(57) ABSTRACT

A DC voltage input through an input terminal is applied through an inductor, to a power supply circuit unit and an input voltage detecting circuit. The input voltage detecting circuit detects the input DC voltage and when it is detected that the input voltage value may possibly cause malfunction, a control circuit turns off a switch circuit based on the detection output, whereby power supply from the power supply circuit to a transmission circuit is stopped, and malfunction of the transmission circuit is prevented.

6 Claims, 7 Drawing Sheets

TRANSMITTING APPARATUS

BACKGROUND OF THE INVENTION

1. Field of the Invention

The present invention relates to a transmitting apparatus. More specifically, the present invention relates to a transmitting apparatus for bi-directional microwave communication from general households or small-scale offices to broadcast satellites or communication satellites using microwaves.

2. Description of the Background Art

The market for radio communication utilizing microwaves has been recently developed dramatically, along with developments of various systems including broadcast satellites and communication satellites. At the same time, the Internet has been developed and digital satellite broadcast has started, ever increasing the demand for bi-directional communication.

For bi-directional communication of a small-scale office or a general home using a broadcasting satellite or a communication satellite, it is a dominant practice at present to use the satellite broadcast as a signal transmission path (downstream) from the broadcasting station to a general home, and to use a telephone line as a signal transmission path (upstream) from a general home to the broadcasting station.

The telephone line used for the upstream supports only a slow rate of communication, and therefore it is not suitable for exchanging motion picture, for example, hindering promotion of satellite multimedia applications. Thus, there have been attempts to introduce satellite communication also to the upstream transmission, to enable bi-directional communication.

FIG. 6 shows a concept of bi-directional communication between each home and the broadcasting station through satellite broadcast. Referring to FIG. 6, a parabola antenna 51 is provided on the roof, for example, of a broadcasting station 50, and parabola antennas 62 and 63 are provided on the roofs of homes 60 and 61, respectively. Through broadcasting satellite 70, microwave bi-directional communication is performed between each of the parabola antennas 62 and 63 of respective homes and parabola antenna 51 of broadcasting station 50. For bi-directional communication, microwave of 12 GHz band is used for one direction and microwave of 14 GHz band is used for the other direction. An LNB (Low Noise Blocked Down Converter) similar to the one used in the conventional system for satellite broadcast reception is used as a receiver, and a transmitter is newly provided.

FIG. 7 is a block diagram representing a main portion of such a transmitter. The transmitter shown in FIG. 7 is positioned close to a parabola antenna provided outdoors of a household. An indoor unit, not shown, is provided indoors, by which a signal or an image input through a terminal apparatus such as a personal computer is converted to an intermediate frequency signal of 1 GHz, for example, superposed on a DC voltage of 12V, for example and transmitted to the transmitter through a coaxial cable.

In the transmitter shown in FIG. 7, the DC voltage input through a cable to an input terminal from an IDU (indoor unit) 30 and the intermediate frequency signal superposed thereon are separated by a capacitor C1 and an inductor L1. The intermediate frequency is input through capacitor C1 to a transmission circuit unit 1, and the DC voltage is input through inductor L1 to a power supply circuit unit 2. The intermediate frequency signal input to transmission circuit unit is subjected to amplification of the intermediate signal, frequency conversion from the intermediate frequency signal to a microwave signal having higher frequency based on a local oscillation signal from a local oscillation circuit 20 and amplification of the microwave signal, by an IF amplifier, a mixer 4 and a microwave amplifier 5 contained in transmission circuit unit 1, respectively. The microwave signal is input to a power amplifier 6 to be further amplified to a high power signal, and output from the transmitter, not shown.

Meanwhile, the DC voltage is input to power supply circuit unit 2, at which an optimal voltage to be supplied to transmission circuit unit 1 is generated. For example, when the DC voltage value applied to the input terminal is 13 to 26V, voltages of 8V, 5V and −5V are generated at power supply circuit unit 2, which are supplied to transmission circuit unit 1, respectively.

In the conventional circuit configuration shown in FIG. 7, however, there is a problem that even when a voltage lower than an operational DC voltage is applied, power supply circuit portion 2 operates, and supplies power to transmission circuit unit 1. The DC voltage supplied to the input terminal may possibly be lower than the operational voltage when IDU 30 inhibits operation of the transmitter, or when DC resistance increases because of an accidental bent of a cable connecting IDU 30 with the transmitter.

The voltage supplied from power supply circuit unit 2 to transmission circuit unit 1 depends on an input/output minimum voltage difference (for example, 2V) of a regulator in power supply circuit unit 2, and therefore, when the supplied voltage decreases to 7V, for example, voltage values of 6V, 4V and −4V, which are different from the values 8V, 5V and −5V in a normal operation, will be output.

At this time, it is possible that an active element malfunctions in the transmission circuit unit 1. For example, a negative voltage for gate bias of power amplifier 6 decreases, causing problems such as increase in drain current and heat build up and hence thermal self destruction, variation of S parameter of an active element caused by variation in the supply voltage to the active element and associated abnormal oscillation.

SUMMARY OF THE INVENTION

Therefore, an object of the present invention is to provide a transmitting apparatus in which operation of a transmitter can be stopped when a supply voltage to an input terminal is lower than an operational voltage.

The present invention provides a transmitting apparatus in which an intermediate signal superposed on a DC voltage is input, the input intermediate frequency signal is converted to a microwave signal by a transmission circuit and output, while the DC voltage is input to a power supply circuit to feed power to the transmission circuit, and the transmitting apparatus is controlled by a control circuit such that the input DC voltage is detected and based on the detection output of an input voltage detecting circuit, power supplied from the power supply circuit to the transmission circuit is turned on/off by a switch circuit.

Therefore, according to the present invention, when the DC voltage value to the input terminal is a low voltage value that may possibly cause malfunction (such as increase in drain current and heat build up caused by decrease of negative voltage for rate bias of the power amplifier, resulting thermal self destruction of the device, variation in S parameter of an active element caused by variation of supply voltage to the active element and resulting abnormal oscillation), power supply from the power supply circuit unit to the transmission circuit unit can be cut, whereby malfunction of the transmission circuit unit can be prevented.

The input voltage detecting circuit includes a reference voltage generating circuit generating a reference voltage, and a comparing circuit comparing the reference voltage with the input DC voltage and outputting a result to the control circuit. When the input DC voltage is the same or higher than the reference voltage, the control circuit turns on the switch circuit, and when the input DC voltage is lower than the reference voltage, the control circuit turns off the switch circuit.

The comparing circuit is formed of a Schmidt trigger circuit.

Further, the control circuit includes a timer circuit measuring the duration of the state where the input DC voltage is lower than the reference voltage, and when the state where the input DC voltage is lower than the reference voltage continues longer than a prescribed time period, the switch circuit is turned off.

Further, the power supply circuit is formed of a switching regulator including a switch circuit.

Further, the switch circuit includes an alarm circuit notifying turning-off.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
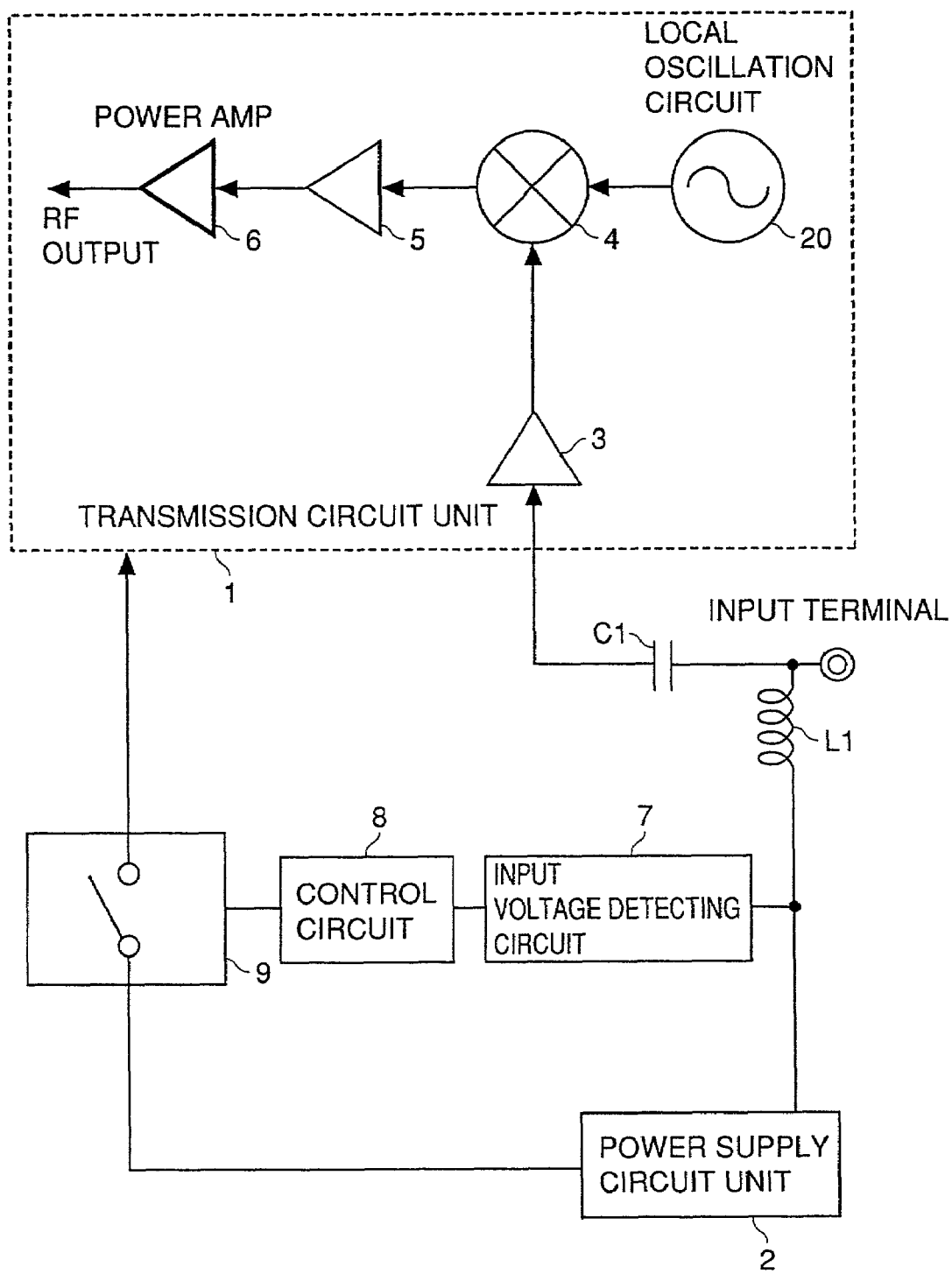
FIG. 1 is a block diagram representing a transmitting apparatus in accordance with a first embodiment of the present invention.

FIG. 1 is a block diagram of a transmitting apparatus in accordance with the first embodiment of the present invention. A DC voltage input from an IDU (In Door Unit) through a cable to an input terminal and an intermediate frequency signal superposed thereon are separated by a capacitor C1 and an inductor L1, and the intermediate frequency signal is input to a transmission circuit unit 1 through capacitor C1 while the DC voltage is input through inductor L1 to power supply circuit unit 2 and an input voltage detecting circuit 7.

The intermediate frequency signal input to transmission circuit unit 1 is subjected to amplification, frequency conversion from the intermediate frequency signal to a microwave signal having higher frequency and amplification of the microwave signal, at an IF amplifier 3, a mixer 4 and A local oscillation circuit 20, and a microwave amplifier 5 contained in the transmission circuit unit 1, respectively. The microwave signal is input to a power amplifier 6 to be amplified to a signal of higher power, and output from a transmitter.

From the DC voltage input to power supply circuit unit 2, a voltage optimal for supply to the transmission circuit unit 1 is generated by power supply circuit unit 2. For example, when the DC voltage applied to the input terminal is 13 to 26V, voltages of 8V, 5V and −5V are generated at the power supply circuit unit.

Further the input DC voltage is detected by input voltage detecting circuit 7, and the result of detection is input to control circuit 8. In response to the result of detection by input voltage detecting circuit 7, control circuit 8 controls switching circuit 9. More specifically, when the input voltage value is a low voltage value that may possibly cause malfunction, control circuit 8 turns off the switch circuit 9 based on the result of detection by input voltage detecting circuit 7. Thus, power supply from power supply circuit unit 2 to transmission circuit unit 1 is cut, and malfunction of transmission circuit unit 1 can be prevented.

Figure 2:
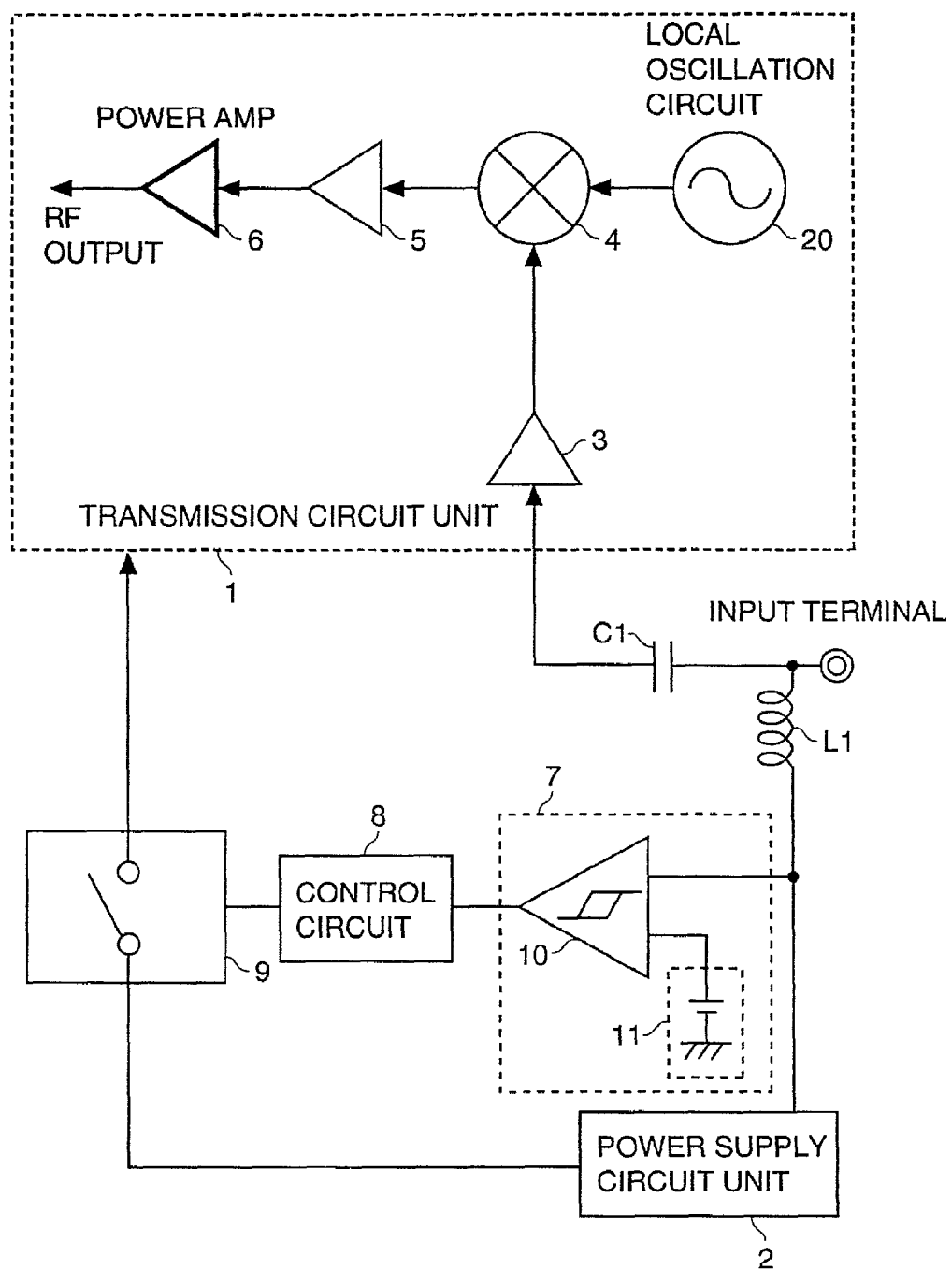
FIG. 2 is a block diagram representing a transmitting apparatus in accordance with a second embodiment of the present invention.

FIG. 2 is a block diagram more specifically showing the input voltage detecting circuit of the embodiment shown in FIG. 1. The input voltage detecting circuit 7 includes a comparing circuit 7 and a reference voltage generating circuit 11. Reference voltage generating circuit 11 includes a divisional resistance, a variable resistance or the like, which generates an arbitrary reference voltage by dividing the power supply voltage, and applies the resulting reference voltage to comparing circuit 10.

Comparing circuit 10 compares the DC voltage values supplied from the input terminal and reference voltage generating circuit 11, and operates control circuit 8 such that switch circuit 9 is turned on when the DC voltage value supplied from the input terminal is the same or higher than the reference voltage and switch circuit 9 is turned off when the DC voltage value supplied from the input terminal is lower than the reference voltage.

For example, when the DC voltage value generated by reference voltage generating circuit 11 is 11V and the DC voltage value input to the input terminal is the same or higher than 11V, the power from power supply circuit unit 2 is supplied to transmission circuit unit 1, and when the DC voltage value input to the input terminal is lower than 11V, power supply from power supply circuit unit 2 to transmission circuit 1 is stopped, the operation of transmission circuit unit 1 is stopped, and the operation of transmission circuit unit 1 is stopped.

Further, it is preferred that comparing circuit 10 is implemented by a Schmidt trigger circuit. When it is implemented by a Schmidt trigger circuit, the chattering phenomenon experienced when the DC voltage values supplied from the input terminal and the reference voltage generating circuit 11 are approximately the same can be avoided by hysteresis.

Figure 3:
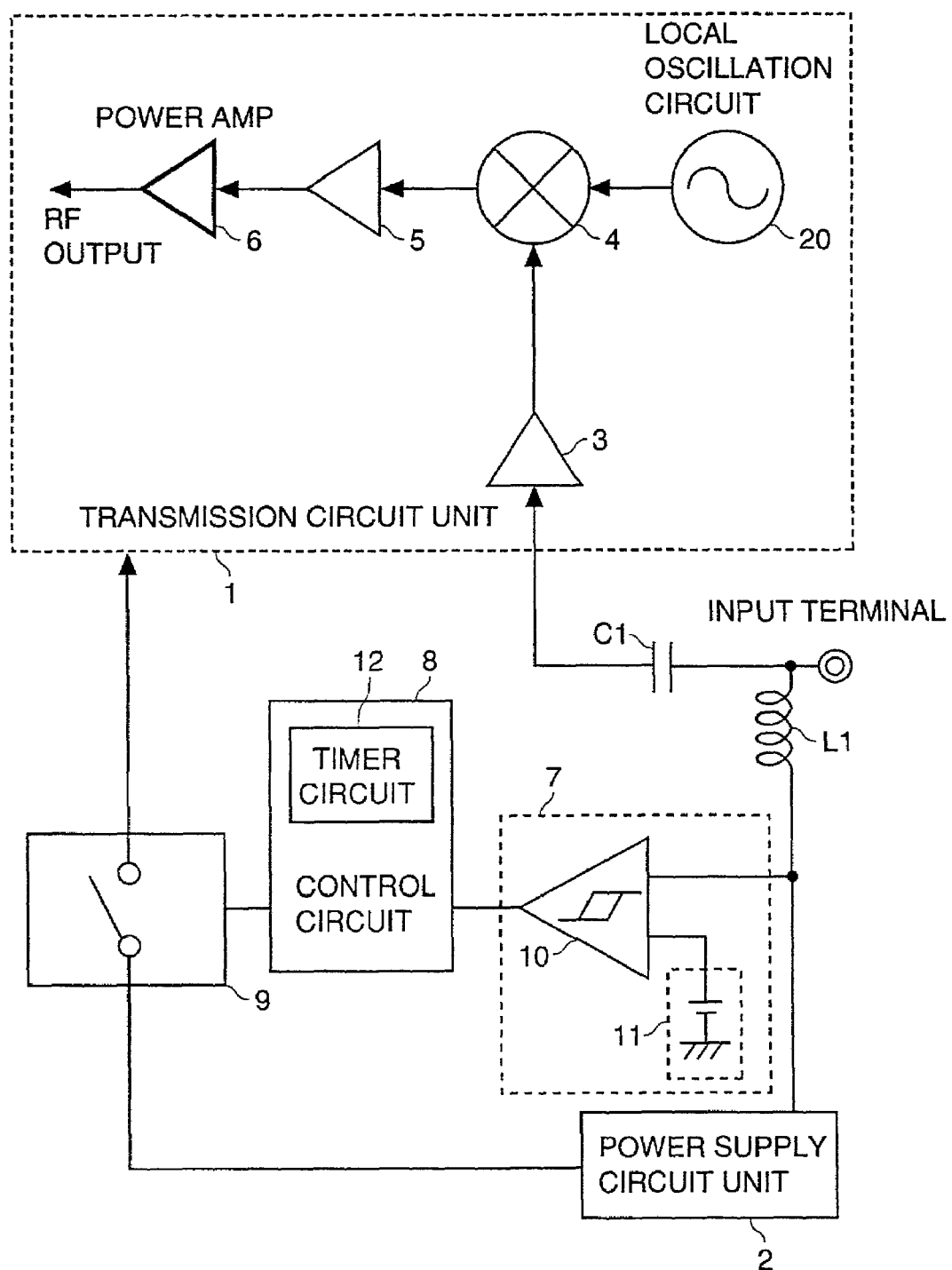
FIG. 3 is a block diagram representing a transmitting apparatus in accordance with a third embodiment of the present invention.

FIG. 3 shows the control circuit 8 in accordance with the embodiment shown in FIG. 1 additionally including a timer circuit 12. Timer circuit 12 measures the time of duration of a state where the DC voltage value to the input terminal is lower than the reference voltage value. When the state where the DC voltage value to the input terminal is lower than the reference voltage value continues for a prescribed time period, control circuit 8 turns off switch circuit 9. Thus, operation of the transmitter is not stopped in a case of an instantaneous drop of the supply voltage due to a change in IDU power supply environment, and therefore, communication with a satellite can be maintained.

Figure 4:
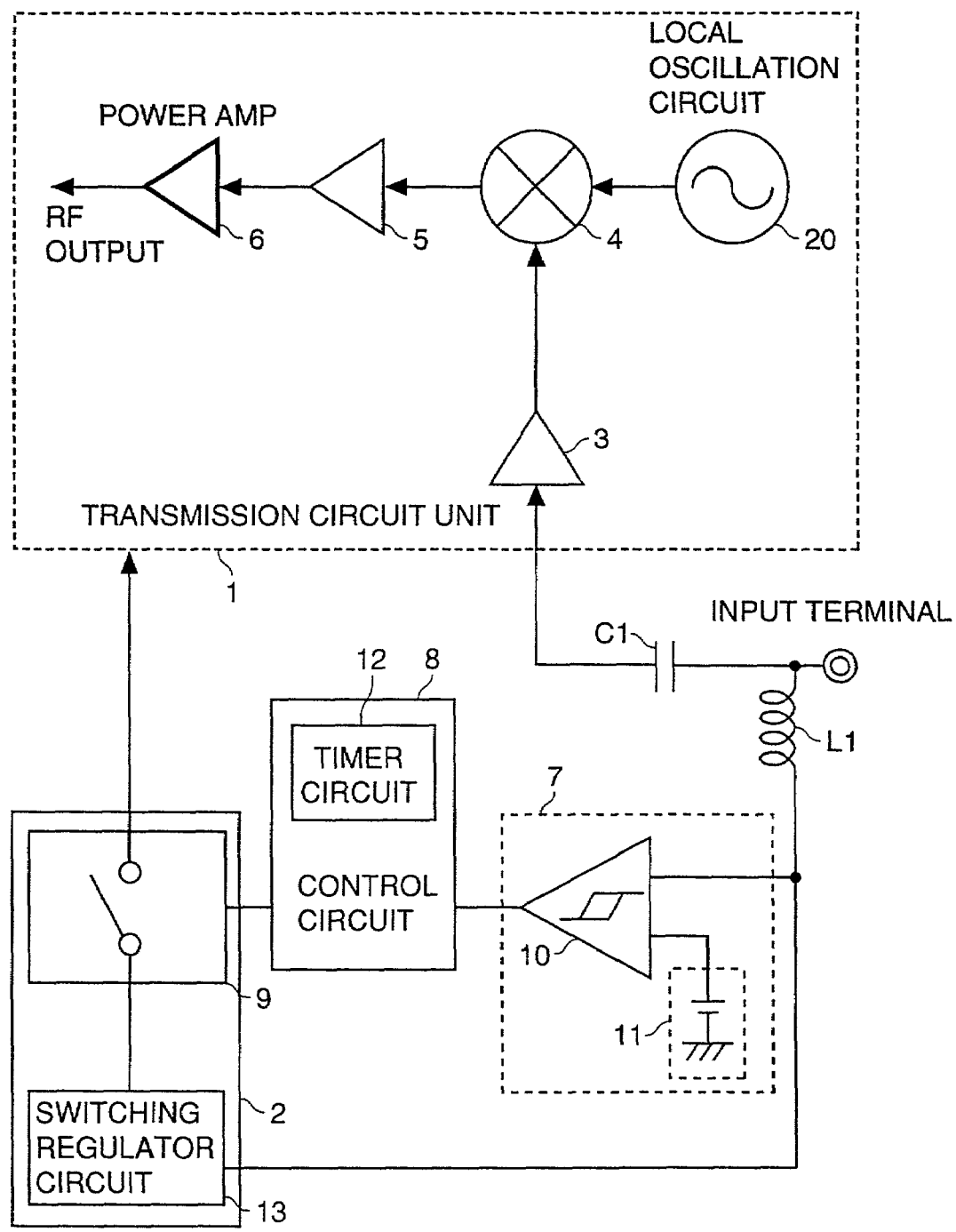
FIG. 4 is a block diagram representing a transmitting apparatus in accordance with a fourth embodiment of the present invention.

FIG. 4 is a block diagram representing a fourth embodiment of the present invention, in which power supply circuit unit 2 of the embodiment shown in FIG. 3 is implemented by a switching regulator 13 and switch circuit 9 is included in power supply circuit unit 2. It has been increasingly common to implement power supply circuit unit 2 by an integrated switching regulator circuit 13 in view of power saving, and there are a number of IC chips including a switch circuit Q. By implementing with an IC, the cost can be reduced, and the substrate for mounting can be made smaller.

Figure 5:
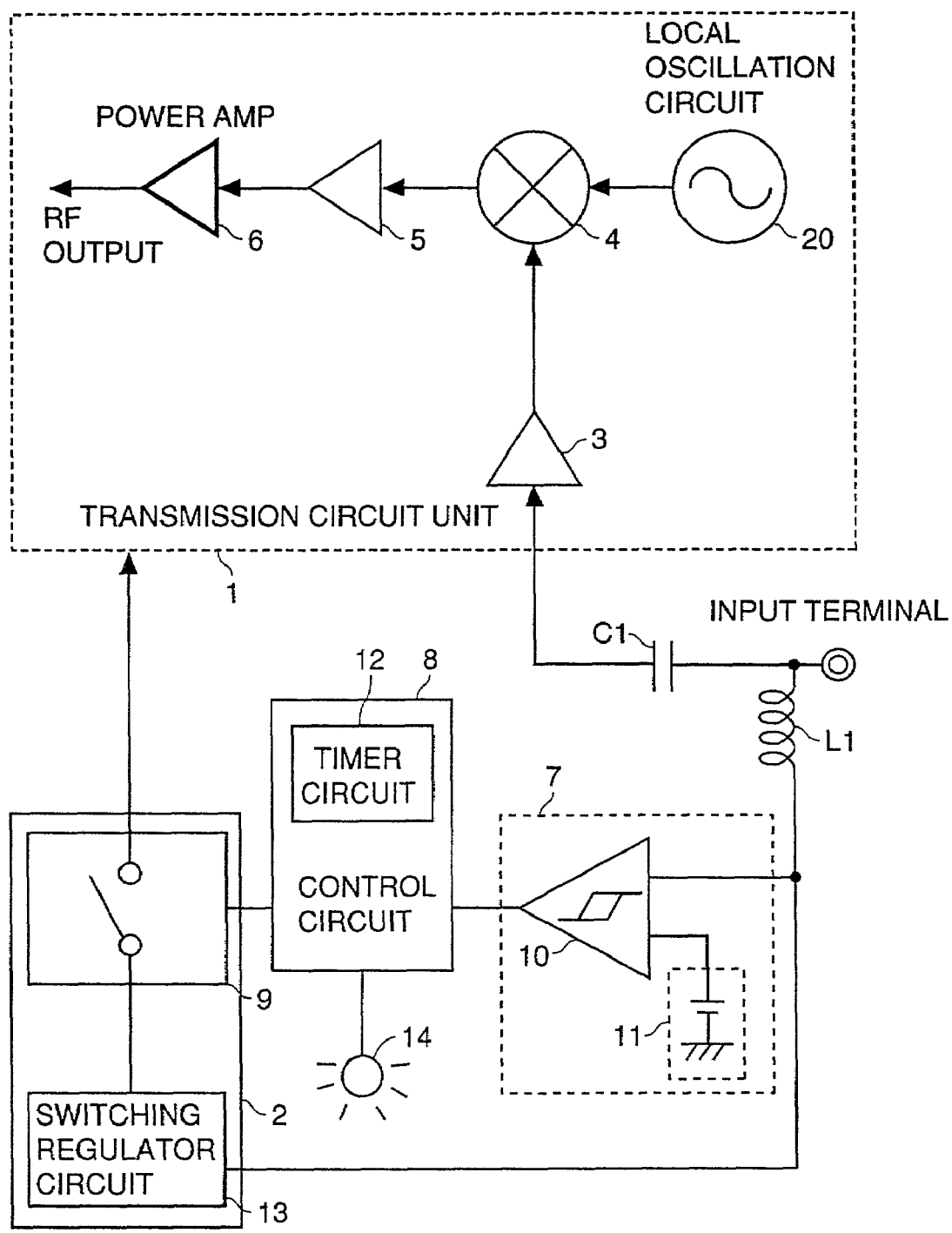
FIG. 5 is a block diagram representing a transmitting apparatus in accordance with a fifth embodiment of the present invention.
Figure 6:
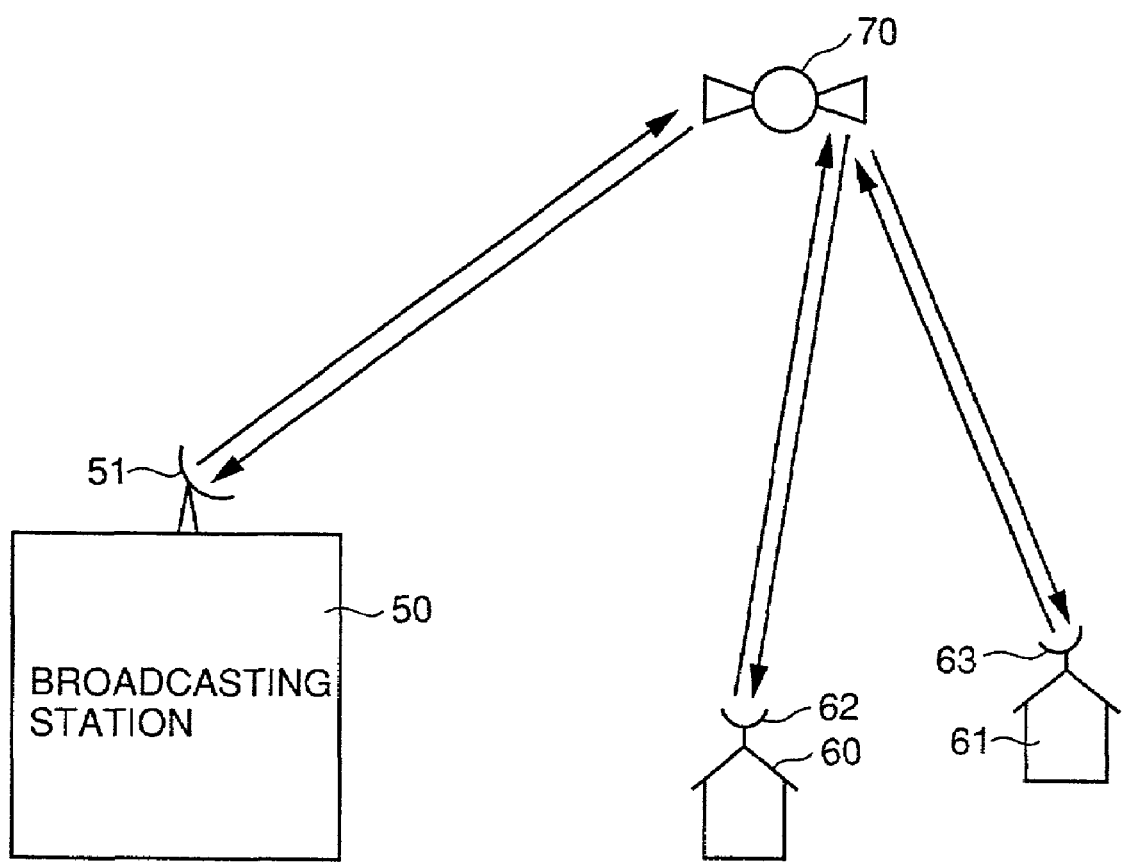
FIG. 6 is a schematic illustration representing bi-directional communication between each household and a broadcasting station through a broadcasting satellite.
Figure 7:
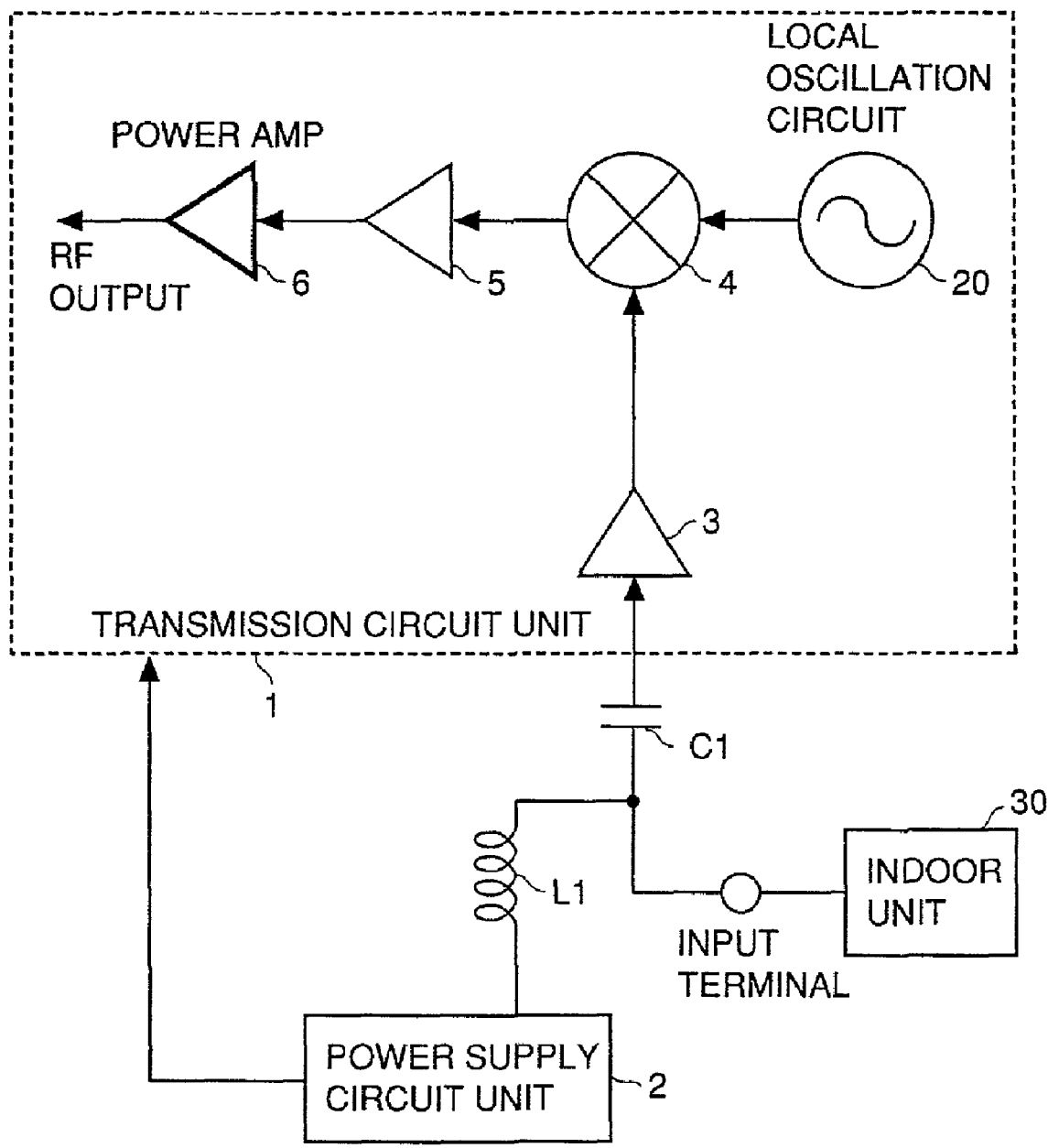
FIG. 7 is a block diagram representing a conventional transmitting apparatus.

FIG. 5 is a block diagram representing a fifth embodiment of the present invention. In this embodiment, an alarm circuit 14 is added to the embodiment of FIG. 4. Alarm circuit 14 is provided to notify that the operation of the transmitter is stopped because of a decrease in power supply voltage, so that it becomes possible to recognize the stop of operation of the transmitter in a simple manner. As on/off of operation of the transmitter can be confirmed in a simple manner, it is very convenient to check operations or malfunctions, for installment or maintenance. The power output from the transmitter is as large as about 1 W. Therefore, the alarm circuit also functions as means for attracting attention, as it is desirable not to come closer to the transmitter when it is in operation to avoid any undesirable influence.

Alarm circuit 14 may preferably be implemented by an LED or the like that allows visual confirmation, and on/off of the circuit is controlled by control circuit 8 in the similar manner as for switch circuit 9.

As described above, according to the embodiments of the present invention, the input DC voltage is detected, and switch circuit turning on/off the power supply from the power supply circuit unit to the transmission circuit unit is controlled based on the detection output. Therefore, when the DC voltage value to the input terminal has a low voltage value that may possibly cause malfunction (such as increase in drain current and heat build up caused by decrease of negative voltage for gate biasing of power amplifier, resulting thermal self destruction of the device, variation in S parameter of an active element caused by variation in voltage supplied to the active element and resulting abnormal oscillation), power supply from the power supply circuit unit to the transmission circuit unit can be stopped, and hence malfunction of the transmission circuit unit can be prevented.

Further, the input DC voltage and the reference voltage are compared by the comparing circuit, the switch circuit is turned on when the input DC voltage is the same or higher than the reference voltage and the switch circuit is turned off when the input DC voltage is lower than the reference voltage, and therefore it is possible to turn off the operation of the transmitter with high accuracy in a simple manner.

Further, the DC voltage of the reference voltage generating circuit can be set arbitrarily to a value of the supply voltage to the input terminal that may cause malfunction of the transmission circuit unit. Therefore, when the voltage value that may cause malfunction is changed by design change of the power supply circuit unit and transmission circuit unit, the reference voltage can be changed so as to properly turn off the operation of the transmitter.

Further, when the comparing circuit is implemented by a Schmitt trigger circuit, the chattering phenomenon experienced when the DC voltages supplied from the input terminal and the reference voltage generating circuit respectively have approximately the same value can be avoided by hysteresis.

The time of duration of the state where the input DC voltage is lower than the reference voltage is measured by timer means, and the switch circuit is turned off when the counted time reaches a prescribed time period. Therefore, the operation of the transmitter is not stopped when the supply voltage drops instantaneously because of change in IDU power supply environment, and hence communication with a satellite can be maintained.

Further, when the power supply circuit unit is implemented by a switching regulator including switch means, power can be saved. Further, when the switch circuit is incorporated in an integrated switching regulator circuit, one chip IC can be used, and hence the cost can be reduced and the substrate for mounting can be made smaller.

As an alarm circuit for notifying turning off of the switch circuit is provided, it becomes possible to confirm on/off of the operation of the transmitter in a simple manner, which is very convenient for checking operation and malfunction at the time of installation and maintenance. As the power output from the transmitter is as high as about 1 W, it is desirable not to come closer to the transmitter when it is in operation to avoid any undesirable influence, and the alarm can be used for attracting attention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A transmitting apparatus, comprising:
    a transmission circuit receiving an intermediate frequency signal superposed on a DC voltage, converting the intermediate frequency signal to a microwave signal and outputting;
    a power supply circuit receiving said DC voltage as an input and supplying power to said transmission circuit;
    an input voltage detecting circuit detecting said input DC voltage;
    a switch circuit turning on/off the power supplied from said power supply circuit to said transmission circuit; and
    a control circuit controlling said switch circuit to be turned off based on a detection output from said input voltage detecting circuit when said DC voltage has such a value that the power supplied from said power supply circuit to said transmission circuit causes abnormal operation of said transmission circuit.

2. The transmitting apparatus according to claim 1, wherein
    said input voltage detecting circuit includes
    a reference voltage generating circuit generating a reference voltage, and
    a comparing circuit comparing the reference voltage generated from said reference voltage generating circuit with said input DC voltage and outputting a result to said control circuit; and
    said control circuit turns on said switch circuit when said input DC voltage is the same or higher than said reference voltage, and turns off said switch circuit when said input DC voltage is lower than said reference voltage.

3. The transmitting apparatus according to claim 2, wherein
said comparing circuit is implemented by a Schmidt trigger circuit.

4. The transmitting apparatus according to claim 2, wherein
said control circuit includes a timer circuit counting time of duration of a state where said input DC voltage is lower than said reference voltage, and
said control circuit turns off said switch circuit when said timer circuit counts that duration of the state where said input DC voltage is lower than said reference voltage continued for a prescribed time period.

5. The transmitting apparatus according to claim 2, wherein
said power supply circuit is implemented by a switching regulator including said switch circuit.

6. The transmitting apparatus according to claim 2, further comprising
an alarm circuit notifying turning off of said switch circuit.

* * * * *